United States Patent
Yim et al.

(10) Patent No.: US 12,147,767 B2
(45) Date of Patent: *Nov. 19, 2024

(54) RECOMMENDING ACTION(S) BASED ON ENTITY OR ENTITY TYPE

(71) Applicant: GOOGLE LLC, Mountain View, CA (US)

(72) Inventors: Keun Soo Yim, San Jose, CA (US); Kyung Yul Lim, Santa Clara, CA (US); Umesh Patil, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,707

(22) Filed: May 8, 2023

(65) Prior Publication Data

US 2023/0274090 A1  Aug. 31, 2023

Related U.S. Application Data

(63) Continuation of application No. 17/082,580, filed on Oct. 28, 2020, now Pat. No. 11,790,173.

(Continued)

(51) Int. Cl.
*G06F 40/295* (2020.01)
*G06F 40/205* (2020.01)
(Continued)

(52) U.S. Cl.
CPC .......... *G06F 40/295* (2020.01); *G06F 40/205* (2020.01); *G06F 40/279* (2020.01); *G10L 15/19* (2013.01)

(58) Field of Classification Search
CPC .... G06F 40/295; G06F 40/279; G06F 40/205; G06F 40/274; G06F 40/30; G06F 40/35;
(Continued)

(56) References Cited

U.S. PATENT DOCUMENTS 10,142,222 B1 * 11/2018 Zhang .................. H04L 67/306
10,180,965 B2  1/2019  Aggarwal et al.
(Continued)

FOREIGN PATENT DOCUMENTS

WO     2020040744      2/2020
WO  WO-2020117302 A1 *  6/2020  ............. G05B 15/02

OTHER PUBLICATIONS

European Patent Office; International Search Report and Written Opinion issued in PCT Application No. PCT/US2021/054671; 14 pages; dated Jan. 27, 2022.

(Continued)

*Primary Examiner* — Richemond Dorvil
*Assistant Examiner* — Nadira Sultana
(74) *Attorney, Agent, or Firm* — Gray Ice Higdon

(57) ABSTRACT

Implementations are described herein for recommending actions based on entity or entity type. In various implementations, a partial free-form natural language input may be received from a user at an input component of a computing device. The partial free-form natural language input may identify an entity without identifying a responsive action and may be directed by the user to an automated assistant that operates at least in part on the computing device. The partial free-form natural language input may be analyzed to identify the entity. Based on the identified entity, a plurality or superset of candidate responsive actions may be identified, filtered, and/or ranked based on one or more signals. The automated assistant may then provide output that recommends one or more of the candidate responsive actions based on the ranking and/or filtering.

20 Claims, 11 Drawing Sheets

Related U.S. Application Data

(60) Provisional application No. 63/104,400, filed on Oct. 22, 2020.

(51) Int. Cl.
*G06F 40/279* (2020.01)
*G10L 15/19* (2013.01)

(58) Field of Classification Search
CPC ........ G06F 40/58; G06F 3/04883; G06F 8/38; G10L 15/19; G10L 15/22
See application file for complete search history.

(56) References Cited

U.S. PATENT DOCUMENTS

| | | | |
|---|---|---|---|
| 10,853,103 B2* | 12/2020 | Zhu | H04L 51/52 |
| 10,956,425 B2 | 3/2021 | Aggarwal et al. | |
| 11,269,305 B2* | 3/2022 | Ni | H04L 12/282 |
| 2010/0306191 A1* | 12/2010 | LeBeau | G06F 16/24578 707/723 |
| 2014/0358958 A1 | 12/2014 | Mandic et al. | |
| 2016/0217124 A1* | 7/2016 | Sarikaya | G06F 40/279 |
| 2016/0360382 A1* | 12/2016 | Gross | H04W 4/40 |
| 2018/0129648 A1* | 5/2018 | Chakravarthy | G06F 40/58 |
| 2018/0189267 A1* | 7/2018 | Takiel | G10L 15/19 |
| 2018/0218042 A1 | 8/2018 | Krishnan et al. | |
| 2019/0141494 A1 | 5/2019 | Gross et al. | |
| 2019/0324780 A1 | 10/2019 | Zhu et al. | |
| 2019/0340202 A1 | 11/2019 | Kandur Raja et al. | |
| 2020/0380973 A1* | 12/2020 | Novitchenko | G06F 40/35 |
| 2021/0191948 A1 | 6/2021 | Aggarwal | |
| 2021/0312904 A1* | 10/2021 | Shukla | G06F 16/3329 |
| 2021/0390259 A1 | 12/2021 | Hildick-Smith et al. | |
| 2021/0406738 A1 | 12/2021 | O'Donncha et al. | |
| 2022/0028379 A1* | 1/2022 | Carbune | G10L 15/22 |
| 2022/0067767 A1 | 3/2022 | Carbune et al. | |
| 2022/0129631 A1 | 4/2022 | Yim et al. | |

OTHER PUBLICATIONS

Akbulut, "All about entities: Dictionaries and Patterns with Watson Assistant (Part 1)" IBM Watson, Apr. 25, 2019 Retreived from https://medium.com/ibm-watson/all-about-entities-dictionaries-and-patterns-with-watson-assistant-part-1-5ef7254df76b.

Dutta, "Book a ride with the Google Assistant" Google Assistant—Google Home, Oct. 4, 2018. Retrieved from https://www.blog.google/products/assistant/book-ride-google-assistant/.

* cited by examiner

RECOMMENDING ACTION(S) BASED ON ENTITY OR ENTITY TYPE

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," "virtual assistants," etc.). For example, humans (which when they interact with automated assistants may be referred to as "users") may provide commands, queries, and/or requests (collectively referred to herein as "queries") using free-form natural language input which may include vocal utterances converted into text and then processed and/or typed free-form natural language input. Automated assistants may perform various types of processing on the natural language input, such as natural language processing, syntactic processing, semantic processing, etc., in order to identify and respond to the user's intent.

Free-form natural language input is input that is formulated by a user and that is not constrained to a group of options presented for selection by the user. Consequently, the user is able to issue virtually any command he or she likes, and the automated assistant will attempt to respond. If the user is unfamiliar with the automated assistant, the user may not realize what types of responsive actions are available for performance by the automated assistant. Accordingly, the user may issue commands that are invalid, or may be hesitant to issue commands due to his or her unfamiliarity with the automated assistant.

SUMMARY

Techniques are described herein for recommending actions based on entity or entity type. In various implementations, a partial free-form natural language input may be received from a user at an input component of a computing device. The partial free-form natural language input may identify an entity without identifying a responsive action and may be directed by the user to an automated assistant that operates at least in part on the computing device. The partial free-form natural language input may be analyzed to identify the entity. Based on the identified entity, a plurality or superset of candidate responsive actions may be identified, filtered, and/or ranked based on one or more signals. The automated assistant may then provide output that recommends one or more of the candidate responsive actions based on the ranking and/or filtering.

In various implementations, a method may be implemented using one or more processors and may include: receiving a partial free-form natural language input from a user at an input component of a computing device, wherein the partial free-form natural language input identifies an entity without identifying a responsive action and is directed by the user to an automated assistant that operates at least in part on the computing device; analyzing the partial free-form natural language input to identify the entity; based on the identified entity, identifying a plurality of candidate responsive actions; ranking at least some of the plurality of candidate responsive actions based on one or more signals; and causing the automated assistant to provide output that recommends one or more of the candidate responsive actions that are selected based on the ranking.

In various implementations, the plurality of candidate responsive actions include a plurality of applications installed on or available via the computing device, and the one or more signals include: how recently each of the plurality of applications was used by the user; or how frequently each of the plurality of applications are used by the user.

In various implementations, the method may further include filtering one or more of the plurality of candidate responsive actions from consideration for the output based on a current context of the user, wherein the current context is determined based on one or more contextual signals. In various implementations, the one or more contextual signals may include a state of a given application executing at least in part on the computing device, and the filtering may include filtering the given application or another application of a same application type as the given application from consideration for the output. In various implementations, the application type may include rideshare applications, and the state of the given application may indicate that the user is already travelling as part of a rideshare.

In various implementations, the one or more contextual signals may include a state of a given application executing at least in part on the computing device, and the filtering may include filtering a first responsive action available via the given application from consideration for the output.

In various implementations, the entity may be a location, the one or more contextual signals may include a distance between a current location of the user and the location, and the filtering may include filtering one or more of the plurality of candidate responsive actions from consideration for the output based on the distance.

In various implementations, one or more of the plurality of candidate responsive actions may be identified or ranked based on a state of a given application executing at least in part on the computing device. In various implementations, the given application may be an exercise application, the state of the given application may indicate that the user is currently exercising, and the one or more of the plurality of candidate responsive actions that is identified or ranked based on the state of the given application may include ceasing monitoring of the exercising of the user. In various implementations, the given application may be a rideshare application, the state of the given application may indicate that the user is currently travelling as part of a rideshare, and the one or more of the plurality of candidate responsive actions that is identified or ranked based on the state of the given application may include: altering a destination of the user; or causing a communication to be sent to another user, wherein the communication indicates a current location or estimated arrival time of the user.

Systems and computer-readable media (transitory and non-transitory) configured for carrying out various aspects of the present disclosure, such as the method described above, are also provided. It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
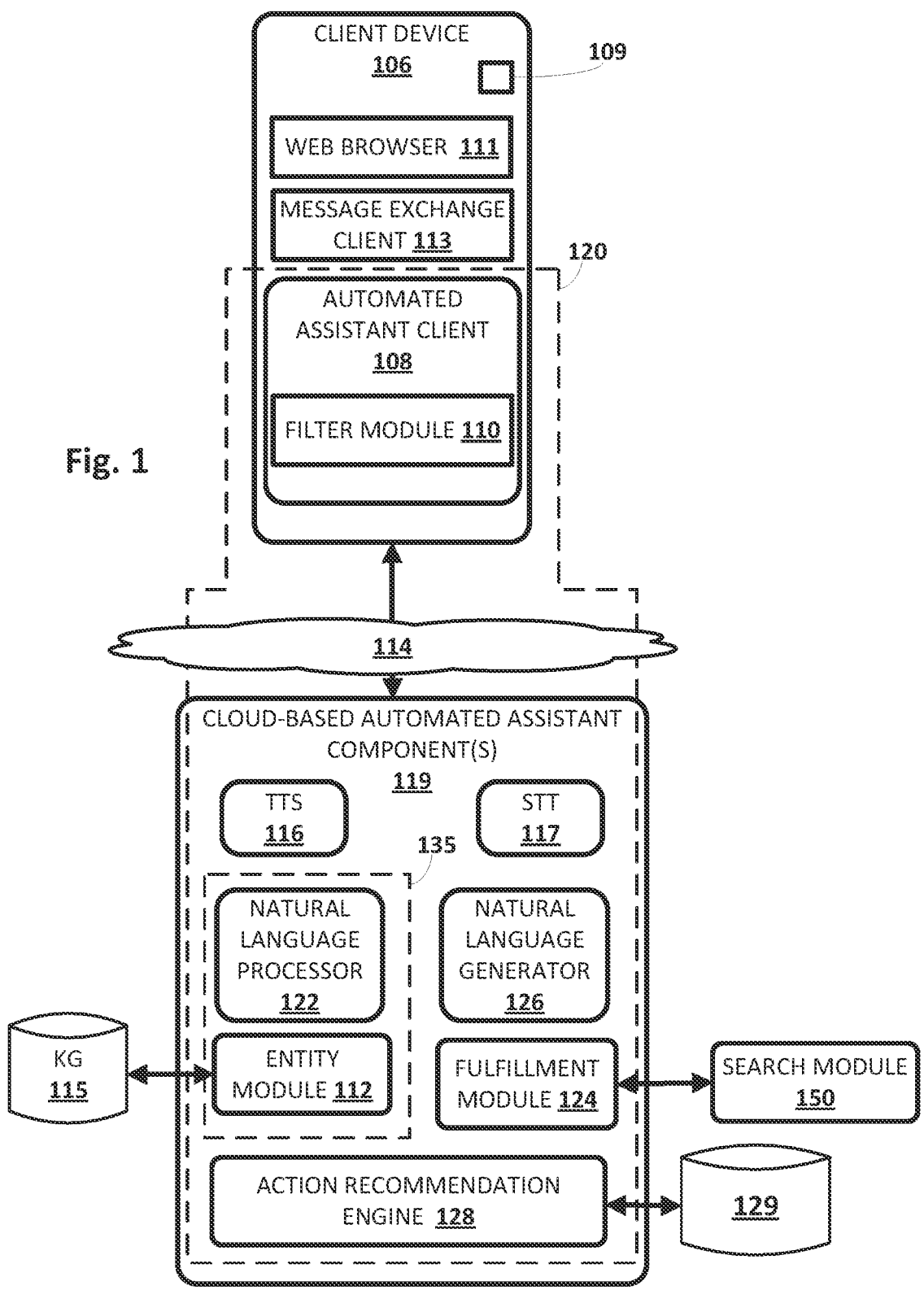
FIG. 1 is a block diagram of an example environment in which implementations disclosed herein may be implemented.

Implementations are described for recommending actions based on entity or entity type. In various implementations, a partial free-form natural language input may be received from a user at an input component of a computing device. The partial free-form natural language input may identify an entity or entity type without identifying a responsive action and may be directed by the user to an automated assistant that operates at least in part on the computing device. The partial free-form natural language input may be analyzed to identify the entity or entity type. Based on the identified entity or entity type, a plurality or superset of candidate responsive actions may be identified, filtered, and/or ranked based on one or more signals. The automated assistant may then provide output that recommends one or more of the candidate responsive actions based on the ranking and/or filtering.

Various signals such as contextual signals may be used to perform various aspects of the present disclosure. For example, entity or entity type recognition, entity or entity type ranking, identification of candidate responsive actions associated with entities or entity types, ranking of candidate responsive actions, and/or filtering of candidate responsive actions, may be performed based on contextual signals. Contextual signals or "cues" associated with a user and/or a client device they operate may include, for instance, a location (e.g., determined using GPS, wireless triangulation, inertial measurement units, etc.), time of day, user preferences, calendar entries of the user, communications to/from the user (e.g., emails, direct messages, text messages, etc.), social networking activity, current user activity (e.g., exercising, flying, driving, ridesharing, etc.), applications that are installed or otherwise accessible to the user at any given moment, and state(s) of running applications, to name a few.

Candidate responsive actions may be any action that an automated assistant is capable of performing and/or invoking. Some candidate responsive actions may be used to control appliances and/or other Internet of Things ("IoT") devices, such as lights, locks, thermostats, televisions, speakers, smart blinds, cameras, toys, and so forth. Some candidate responsive actions may be used to procure items such as products, tickets, food (e.g., ordering pizza), etc. Some candidate responsive actions may be applications or "apps" that may be invoked by automated assistant, e.g., with various fields pre-populated based on the free-form natural language input. Some candidate responsive actions may be "intra-app" actions that are performable within an application, such as starting or stopping monitoring of exercise, pausing/playing media files, sharing locations and/ or estimated time of arrival (e.g., via a rideshare or cycling app), altering a destination (e.g., via a rideshare app), and so forth. In the latter case, an application programming interface ("API") may be exposed to an automated assistant directly and/or via an operating system ("OS"), which enables the automated assistant to perform actions within an application.

Now turning to FIG. 1, an example environment in which techniques disclosed herein may be implemented is illustrated. The example environment includes one or more client computing devices 106. Each client device 106 may execute a respective instance of an automated assistant client 108, which may also be referred to herein as a "client portion" of an automated assistant. One or more cloud-based automated assistant components 119, which may also be referred to herein collectively as a "server portion" of an automated assistant, may be implemented on one or more computing systems (collectively referred to as a "cloud" computing system) that are communicatively coupled to client devices 106 via one or more local and/or wide area networks (e.g., the Internet) indicated generally at 114.

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. It thus should be understood that each user that engages with an automated assistant client 108 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 108 executing on a client device 106 operated by the user and one or more cloud-based automated assistant components 119 (which may be shared amongst multiple automated assistant clients 108). It should also be understood that in some implementations, automated assistant 120 may respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. Some client devices 106, such as standalone interactive speakers (or "smart speakers"), may take the form of assistant devices that are primarily designed to facilitate dialog between users and automated assistant 120. Some such assistant devices may take the form of a standalone interactive speaker with an attached display, which may or may not be a touchscreen display.

As described in more detail herein, automated assistant 120 engages in human-to-computer dialog sessions with one or more users via user interface input and output devices of one or more client devices 106. In some implementations, automated assistant 120 may engage in a human-to-computer dialog session with a user in response to user interface input provided by the user via one or more user interface input devices of one of the client devices 106. In some of those implementations, the user interface input is explicitly directed to automated assistant 120. For example, a user may verbally provide (e.g., type, speak) a predetermined invocation phrase, such as "OK, Assistant," or "Hey, Assistant." When spoken, this verbal input may be captured by a microphone 109 and may cause automated assistant 120 to begin actively listening or monitoring typed text. Additionally or alternatively, in some implementations, automated assistant 120 may be invoked based on one or more detected visual cues, alone or in combination with oral invocation phrases.

In various implementations, automated assistant 120 may utilize speech recognition to convert utterances from users into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entity type present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of client computing device 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 108, or "client portion" of automated assistant 120. In various implementations, automated assistant client 108, which may be implemented using any combination of hardware and software, may interface with hardware such as microphone (not depicted) to capture an audio recording of a user's utterance(s). Various types of processing may be performed on this audio recording for various purposes.

Client device 106 may have other applications installed as well, such as a web browser 111 and/or a message exchange client 113. Message exchange client 113 may come in various forms. In some implementations, message exchange client 113 may come in the form of a short messaging service ("SMS") and/or multimedia messaging service ("MMS") client, an online chat client (e.g., instant messenger, Internet relay chat, or "IRC," etc.), a messaging application associated with a social network, and so forth. In some implementations, message exchange client 113 may be implemented within a webpage rendered by web browser 111. In various implementations, message exchange client 113 may provide an interface for a user to engage in typed or spoken human-to-computer dialog with automated assistant 120, as a one-on-one dialog or as a multi-participant dialog in which automated assistant 120 may "participate." In some implementations, web browser 111 may be specially designed, e.g., with a microphone button or other user interface element that is operable to invoke automated assistant 120, so that the user is able to issue voice commands to aid in operation of web browser 111.

In some implementations, automated assistant client 108 may be further configured to convert that captured audio to text and/or to other representations or embeddings, e.g., using speech-to-text ("STT") processing techniques. Additionally or alternatively, in some implementations, automated assistant client 108 may be configured to convert text to computer-synthesized speech, e.g., using one or more voice synthesizers. However, in some cases, because client device 106 may be relatively constrained in terms of computing resources (e.g., processor cycles, memory, battery, etc.), automated assistant client 108 local to client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based text-to-speech ("TTS") module 116 and/or a cloud-based STT module 117.

Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be converted into computer-generated speech at client device 106.

Cloud-based STT module 117 may be configured to leverage the virtually limitless resources of the cloud to convert captured audio data into text, which may then be provided to intent matcher 135. In some implementations, cloud-based STT module 117 may convert an audio recording of speech to one or more phonemes, and then convert the one or more phonemes to text. Additionally or alternatively, in some implementations, STT module 117 may employ a state decoding graph. In some implementations, STT module 117 may generate a plurality of candidate textual interpretations of the user's utterance. In some implementations, STT module 117 may weight or bias particular candidate textual interpretations higher than others depending on whether there are contemporaneously detected visual cues.

Automated assistant 120 (and in particular, cloud-based automated assistant components 119) may include intent matcher 135, the aforementioned TTS module 116, the aforementioned STT module 117, and other components that are described in more detail below. In some implementations, one or more of the modules and/or modules of automated assistant 120 may be omitted, combined, and/or implemented in a component that is separate from automated assistant 120. In some implementations, to protect privacy, one or more of the components of automated assistant 120, such as natural language processor 122, TTS module 116, STT module 117, etc., may be implemented at least on part on client devices 106 (e.g., to the exclusion of the cloud).

In some implementations, automated assistant 120 generates responsive content in response to various inputs generated by a user of one of the client devices 106 during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via client device 106. As used herein, free-form natural language input is input that is formulated by a user and that is not constrained to a group of options presented for selection by the user. Free-form natural language input may be spoken (and captured by microphone 109) and/or typed (e.g., into one or more interfaces provided by one or more applications, such as message exchange client 113).

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

An intent matcher 135 may be configured to determine a user's intent based on input(s) (e.g., vocal utterances, visual cues, etc.) provided by the user and/or based on other signals, such as sensor signals, online signals (e.g., data obtained from web services), and so forth. In some implementations, intent matcher 135 may include a natural language processor 122 and an entity module 112. Natural language processor 122 may be configured to process natural language input generated by user(s) via client device 106 and may generate annotated output (e.g., in textual form) for use by one or more other components of automated assistant 120. For example, the natural language processor 122 may process natural language free-form natural language input that is generated by a user via one or more user interface input devices of client device 106. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, an entity module 112 (also referred to as an "entity tagger") may be configured to perform techniques such as named entity recognition to identify an entity and/or entity type conveyed by spoken and/or typed input of a user. In some implementations, entity module 112 may annotate entity/entity type references in one or more segments such as references to people (including, for instance, literary characters, celebrities, public figures, etc.), organizations, locations (real and imaginary), and so forth. In some implementations, data about entities may be stored in one or more databases, such as in a knowledge graph ("KG") 115. In some implementations, knowledge graph 115 may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

Entity module 112 may annotate references to an entity or entity type at a high level of granularity (e.g., to enable identification of all references to an entity class such as people) and/or a lower level of granularity (e.g., to enable identification of all references to a particular entity such as a particular person). Entity module 112 may rely on content of the natural language input to resolve a particular entity and/or may optionally communicate with knowledge graph 115 or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations entity module 112 may rely on annotations from the coreference resolver and/or dependency parser in annotating all mentions to a particular entity or entity type. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Intent matcher 135 may use various techniques to determine an intent of the user, e.g., based on output from natural language processor 122 (which may include annotations and terms of the natural language input) and/or based on output from entity module 112. In some implementations, intent matcher 135 may have access to one or more databases (not depicted) that include, for instance, a plurality of mappings between grammars, visual cues, and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?" In some implementations, these mappings may include mappings between entities and candidate responsive actions that are performable in association with those entities.

In addition to or instead of grammars, in some implementations, intent matcher 135 may employ one or more trained machine learning models, alone or in combination with one or more grammars and/or visual cues. These trained machine learning models may also be stored in one or more databases and may be trained to identify intents, e.g., by embedding data indicative of a user's utterance and/or any detected user-provided visual cues into a latent space, and then determining which other embeddings (and therefore, intents) are most proximate, e.g., using techniques such as Euclidean distance, cosine similarity, etc.

As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?").

Fulfillment module 124 may be configured to receive the predicted/estimated intent that is output by intent matcher 135, as well as an associated slot values (whether provided by the user proactively or solicited from the user) and carry out (or "resolve," or "fulfill") the intent. In various implementations, fulfillment (or "resolution" or "carrying out") of the user's intent may cause various fulfillment information (also referred to as "responsive" information or "resolution information") to be generated/obtained, e.g., by fulfillment module 124. As will be described below, the fulfillment information may in some implementations be provided to a natural language generator ("NLG" in some FIGS. 126, which may generate natural language output based on the fulfillment information.

Fulfillment (or "resolution") information may take various forms because an intent can be fulfilled (or "resolved") in a variety of ways. Suppose a user requests pure information, such as "Where were the outdoor shots of 'The Shining' filmed?" The intent of the user may be determined, e.g., by intent matcher 135, as being a search query. The intent and content of the search query may be provided to fulfillment module 124, which as depicted in FIG. 1 may be in communication with one or more search modules 150 configured to search corpuses of documents and/or other data sources (e.g., knowledge graphs, etc.) for responsive information. Fulfillment module 124 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oreg." This responsive information may form part of the fulfillment information generated by fulfillment module 124.

Additionally or alternatively, fulfillment module 124 may be configured to receive, e.g., from intent matcher 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

Various aspects of the present disclosure may be implemented in whole or in part by action recommendation engine 128 and/or filter module 110. Either of these components may be implemented in whole or in part on either of client device 106 or cloud-based automated assistant components 119. In general, action recommendation engine 128 may be configured to receive, e.g., from entity module 112, data indicative of an entity or entity type conveyed in input provided at client device 106. Action recommendation engine 128 may then identify a plurality of candidate responsive actions, e.g., from a database 129 of mappings between entities/entity types and responsive actions, that are performable based on that entity. In some cases, action recommendation engine 128 may be part of intent matcher 135.

In this way, if a user wishes to learn what actions are performable in association with a particular entity, the user can simply identify the entity in spoken and/or typed free-form natural language input provided to automated assistant 120. Automated assistant 120 may (e.g., via entity module 112) identify the entity or entity type and then may (e.g., via action recommendation engine 128) identify a plurality of candidate responsive actions that are performable in association with the identified entity or entity type.

In many cases, at least some of those candidate responsive actions may not be applicable in a particular circumstance. For example, one or more candidate responsive actions may be to invoke an application (or "app") that is not installed on client device 106. Additionally, a current context of a user of client device 106 may render at least some candidate responsive actions inapplicable. For example, if the user is located in San Francisco and the identified entity is located in New York, then some responsive actions associated with the identified entity, such as hailing a rideshare to the entity's location, may not be applicable. In some implementations, multiple candidate responsive actions may be potentially applicable, but some may be more likely to satisfy the user than others.

Accordingly, in various implementations, filter module 110 may be configured to rank and/or filter the plurality of candidate responsive actions generated by action recommendation engine 128. In FIG. 1, this ranking/filtering is performed onboard client device 106, but in other implementations, the ranking and/or the filtering can be performed elsewhere, e.g., as part of cloud-based automated assistant components 119. In various implementations, multiple different filters may be applied by filter module 110, with each filter being configured to eliminate one or more candidate responsive actions from consideration for being recommended to the user of client device 106. An example of multiple filters being applied is demonstrated in FIG. 2.

Figure 2:
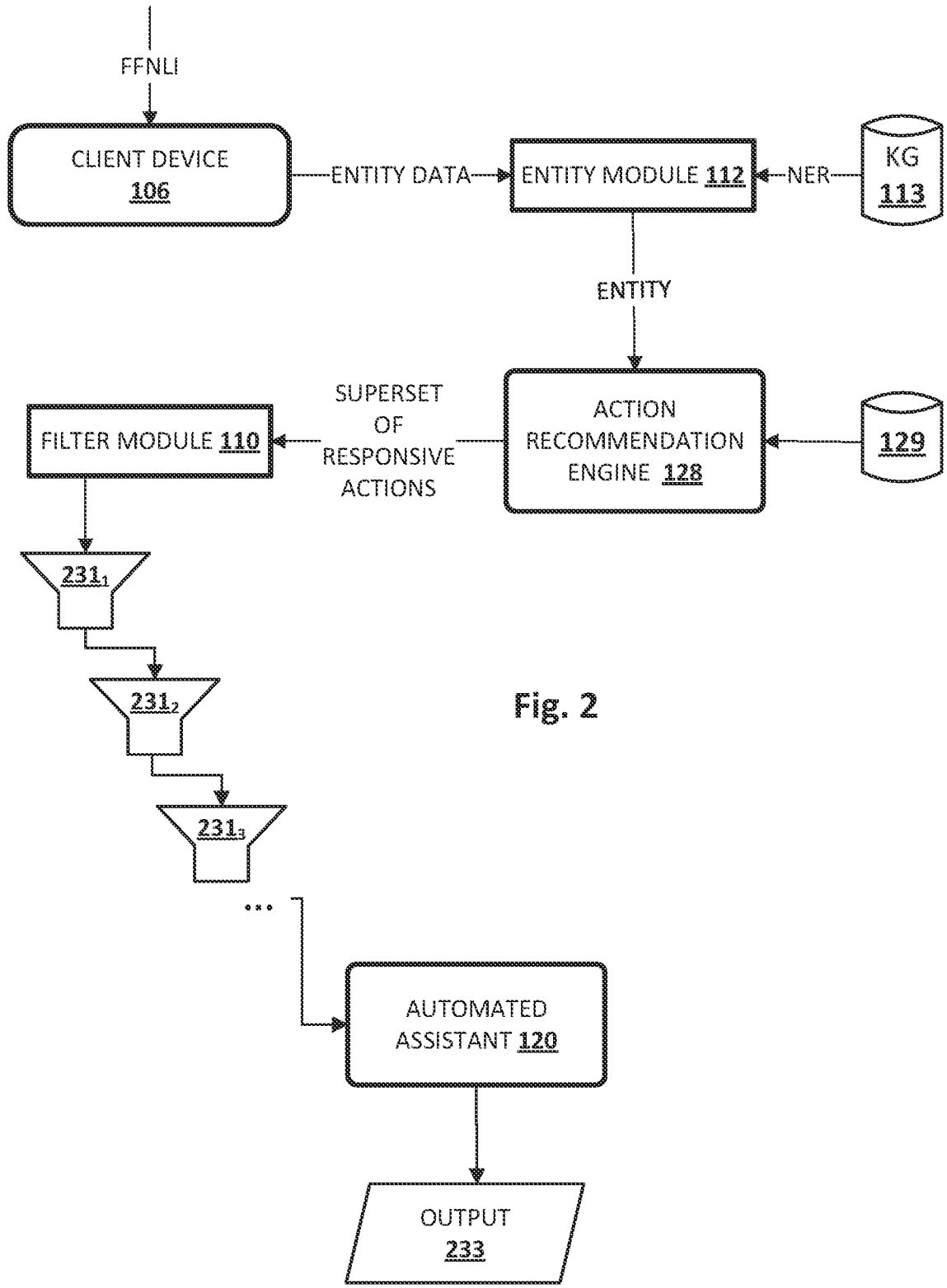
FIG. 2 depicts one example of how data may be processed by various components described herein.

Referring now to FIG. 2, an example of how data may flow between the various components of FIG. 1 is depicted schematically. Starting at top left, a partial free-form natural language input ("FFNLI") may be received from a user at an input component of client device 106. The partial natural language input may identify an entity without identifying a responsive action (e.g., a command) and may be directed by the user to automated assistant 120. Data indicative of the entity (e.g., text typed by the user, speech recognition output generated based on the user's utterance, an embedding) may be provided by client device 106 to entity module 112.

Entity module 112 may perform techniques such as named entity recognition ("NER") to identify, e.g., from knowledge graph 115, one or more entities or entity types that correspond to the user's free-form natural language input. The identified entities or entity types may be ranked in some implementations based on factors such as the entities' relevance to the user making the request. Entities or entity types that are more closely aligned with the user's context, interest, location, etc., may be ranked higher than other entities or entity types with less tenuous connections to the user. These entity rankings may be used downstream in some implementations to, for instance, rank and/or filter candidate responsive actions.

These identified entit(ies) or entity type(s) may be provided to action recommendation engine 128. Action recommendation engine 128 may query database 129 based on the identified entit(ies) or entity type(s) to identify a superset of candidate responsive actions. Data indicative of the superset of candidate responsive actions may then be provided, e.g., by action recommendation engine 128, to filter module 110. Filter module 110 may apply some number of filters $231_1$, $231_2$, $231_3$, . . . to filter at least some responsive actions of the superset from consideration for being output, e.g., by automated assistant 120, as recommended responsive actions.

Additionally or alternatively, filter module 110 (or in some cases, action recommendation engine 128) may use a variety of different signals to rank all candidate responsive actions of the superset, or to rank those candidate responsive actions that remain after the filtering. These signals may include, for instance, the entity rankings described previously, contextual signals, relevancy scores, and so forth.

In various implementations, more or less filters than the three filters $231_1$, $231_2$, $231_3$, . . . depicted in FIG. 2 may be applied by filter module 110, e.g., in the same order as in FIG. 2 or in a different order. Each filter $231_i$ may filter candidate responsive actions for consideration and recommendations based on different contextual signals and/or cues. For example, first filter $231_1$ may be applied by filter module 110 to filter candidate responsive actions based on a current location of client device 106. Suppose client device 106 is located in Japan and the user provides, as free-form natural language input directed at automated assistant 120, the entity "Empire State Building." Because that landmark is located in New York, far from Japan, it would not make sense to reserve a rideshare to the Empire State Building. Accordingly, the candidate responsive action associated with the Empire State Building of "book rideshare to Empire State Building" may be eliminated from consideration as a recommendation.

Second filter $231_2$ may be applied by filter module 110 to filter candidate responsive actions based on a current state of an application executing on client device 106. For example, if a user is already travelling in a rideshare to the Empire State Building, then it wouldn't make sense to present the recommendation "book rideshare to Empire State Building," and therefore, that candidate responsive action may be eliminated from consideration.

Third filter $231_3$ may be applied by filter module 110 to filter candidate responsive actions based on a library of applications installed on client device 106 or otherwise available to a user of client device 106. For example, a candidate responsive action of "stream <movie name> on streaming app A" doesn't make sense if streaming app A is not installed on client device 106, or if the user doesn't have an account on streaming app A. In other implementations, action recommendation engine 128 may generate the list of candidate responsive actions based on what is installed on client device 106, in which case filter module 110 would not need to filter out uninstalled applications (and hence, third filter $231_3$ could be omitted).

The filtered results may then be provided to automated assistant 120, e.g., to automated assistant client 108 and/or cloud-based automated assistant component(s) 119. Whichever the case, automated assistant 120 (e.g., via action recommendation engine or filter module 110) may rank the remaining candidate responsive actions using various factors described previously (e.g., entity rankings, relevancy scores, etc.). Automated assistant 120 may then provide output (computer-generated speech or textual output) that recommends one or more of the candidate responsive actions, such as the highest ranked n candidate responsive actions (n being a positive integer).

Figure 3:
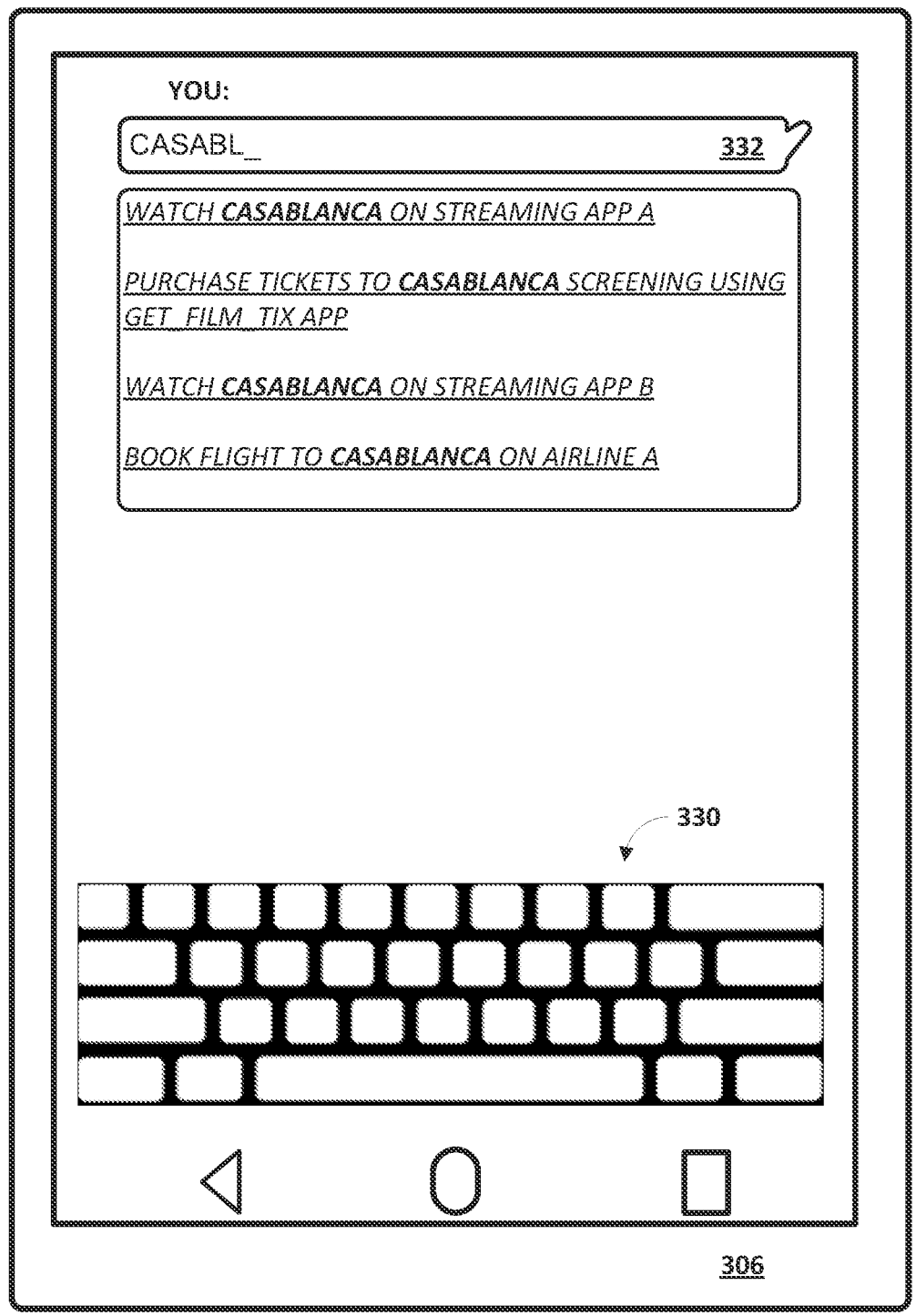
FIG. 3, FIG. 4, FIG. 5, FIG. 6, FIG. 7, FIG. 8, and FIG. 9 demonstrate various scenarios in which selected aspects of the present disclosure may be implemented, in accordance with various implementations.

FIGS. 3-9 depict example scenarios in which techniques described herein are performed to provide recommended responsive actions to users based on user-provided entities or entity types. Referring now to FIG. 3, a client device 306 in the form of a smart phone or tablet provides an interface to interact with automated assistant (e.g., as part of message exchange client 113). A user may provide free-form natural language input to automated assistant 120 by operating a keyboard 330 (hardware or "soft" keyboard) and/or by speaking into a microphone (not depicted) and having a recording of that utterance being STT processed into text.

In this example, the user has provided a partial free-form natural language input ("CASABL") into an input field 332 that partially identifies the entity "Casablanca." The user has not yet provided any sort of command or responsive action identifier. Accordingly, the text "Casabl" is autocompleted to "Casablanca" and is resolved, e.g., by entity module 112, to be either the eponymous film or the city in Morocco. In various implementations, auto-completion of entity names can be performed based on, for instance, analysis of logs of free-form natural language inputs provide to automated assistant 120 by users in general and/or the user of client device 306 specifically.

Based on the film titled "Casablanca" and the city of the same name in Northern Africa, a superset of candidate responsive actions may be identified, e.g., by action recommendation engine 128. These candidate responsive actions may be ranked and/or filtered, e.g., by action recommendation engine 128 and/or filter module 110, until automated assistant 120 is left with a subset of candidate responsive actions that may be suitable for the particular client device 306 and/or the user that controls it.

In this example, four candidate responsive actions of the subset (which may comprise part of or the entirety of the subset) are presented as recommendations to the user. The recommendations may be ordered, for instance, from most likely responsive to least likely responsive. In some implementations, each recommendation may be operable (e.g., clickable) to cause automated assistant 120 to perform that responsive action, e.g., just as though the user had provided that free-form natural language output initially. While depicted as textual links in FIG. 3, in various implementations, these candidate responsive actions/recommendations may alternatively be presented as graphical icons, deep links, etc.

The first candidate responsive action is to watch the film Casablanca on a streaming app A. The second candidate responsive action is to purchase a ticket to an upcoming screening of the film. The third candidate responsive action is to watch the film on a different streaming app B that is also installed on client device 306 (or at the very least is accessible to the user). The fourth candidate responsive action is to book a flight to the city Casablanca.

The order or ranking in which these four candidate responsive actions are presented may be determined based on a variety of different contextual and/or historical signals. Contextually, unless the user is located at or near the city Casablanca (or in/near the country Morocco), the most responsive candidate action for the city may be to purchase a plane ticket to the city. However, unless there is other evidence that the city of Casablanca is relevant to the user (e.g., the user has recently performed web searches about Casablanca, Morocco, Northern Africa, etc.), that candidate responsive action may ranked below the others, especially where, for instance, the user has a known preference or interest in films/filmmaking. On the other hand, if the user were located at or near Morocco, then other candidate responsive actions not presented in FIG. 4, such as book a rideshare to/from Casablanca, book a train ticket to/from Casablanca, etc., may be presented instead.

With regard to the first three candidate responsive actions, two streaming apps, streaming app A and streaming app B, are presented, which suggests that both are either installed on client device 306, or accessible generally to the user of client device 306. If the film "Casablanca" were not available on one of the streaming apps, then that streaming app may not be presented at all. As for streaming app A being ranked above streaming app B, it might be the case that the user (or users generally) use streaming app A more frequently than streaming app B, or that the user has used streaming app A more recently than streaming app B.

The second candidate responsive action—purchase tickets to the screening of Casablanca—may be ranked where it is because, for instance, a screening of the film is scheduled soon at a theatre near where the user lives, and/or near a location of client device (e.g., determined using GPS, wireless triangulation, social media check in, etc.). The second candidate responsive action may be presented below the first candidate responsive action because, for instance, watching the film on streaming app A may be less expensive (e.g., free) than purchasing a ticket to the screening.

Figure 4:
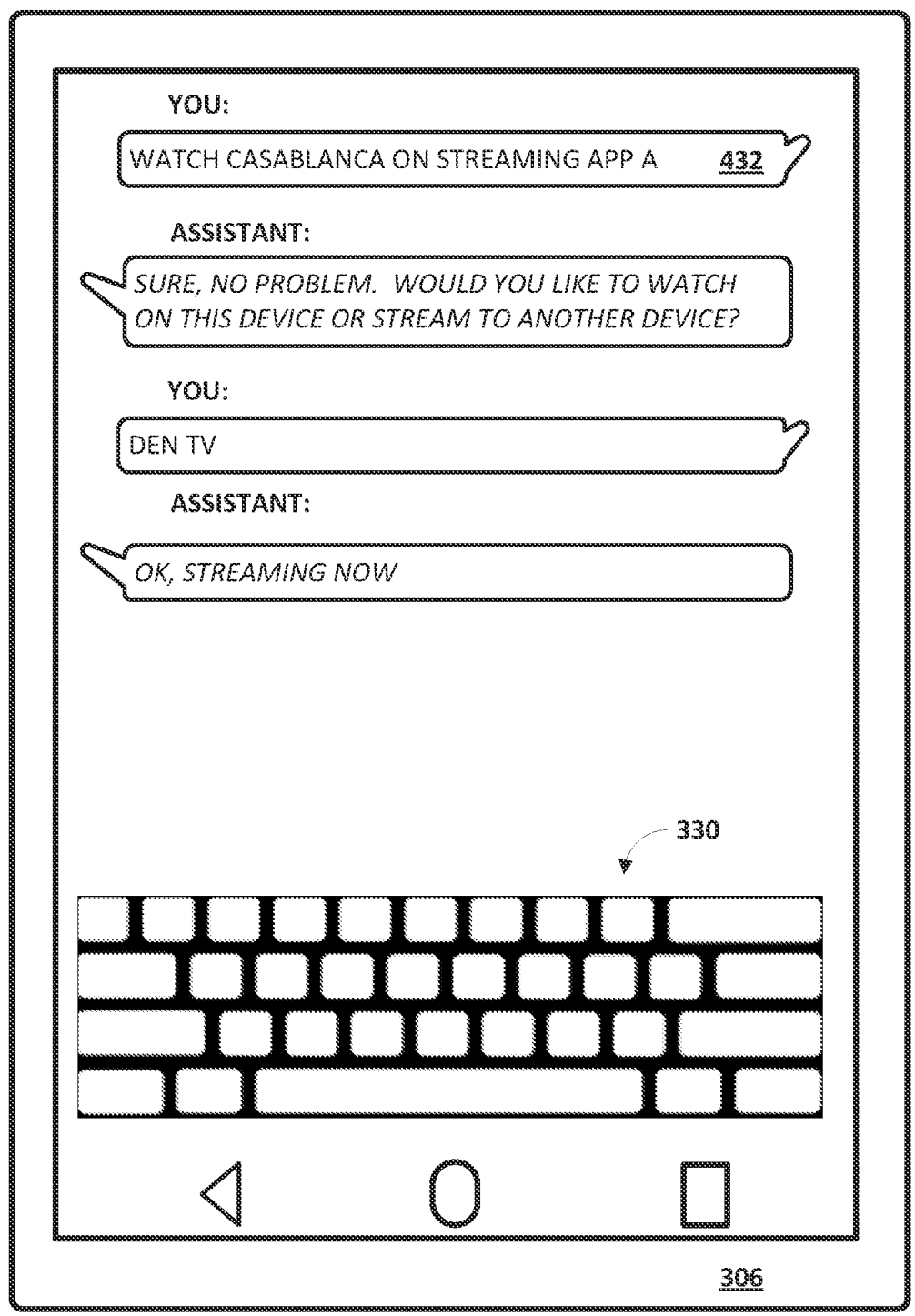

FIG. 4 depicts what might happen when the user selects a candidate responsive action in FIG. 3. In this example, the user selects the first recommendation, "play Casablanca on streaming app A." Consequently, automated assistant 120 replies, "Sure, no problem. Would you like to watch on this device or stream to another device?" The user responds, "Den TV." Automated assistant 120 then replies, "OK, streaming now.," and the film starts streaming on a television (not depicted).

Figure 5:
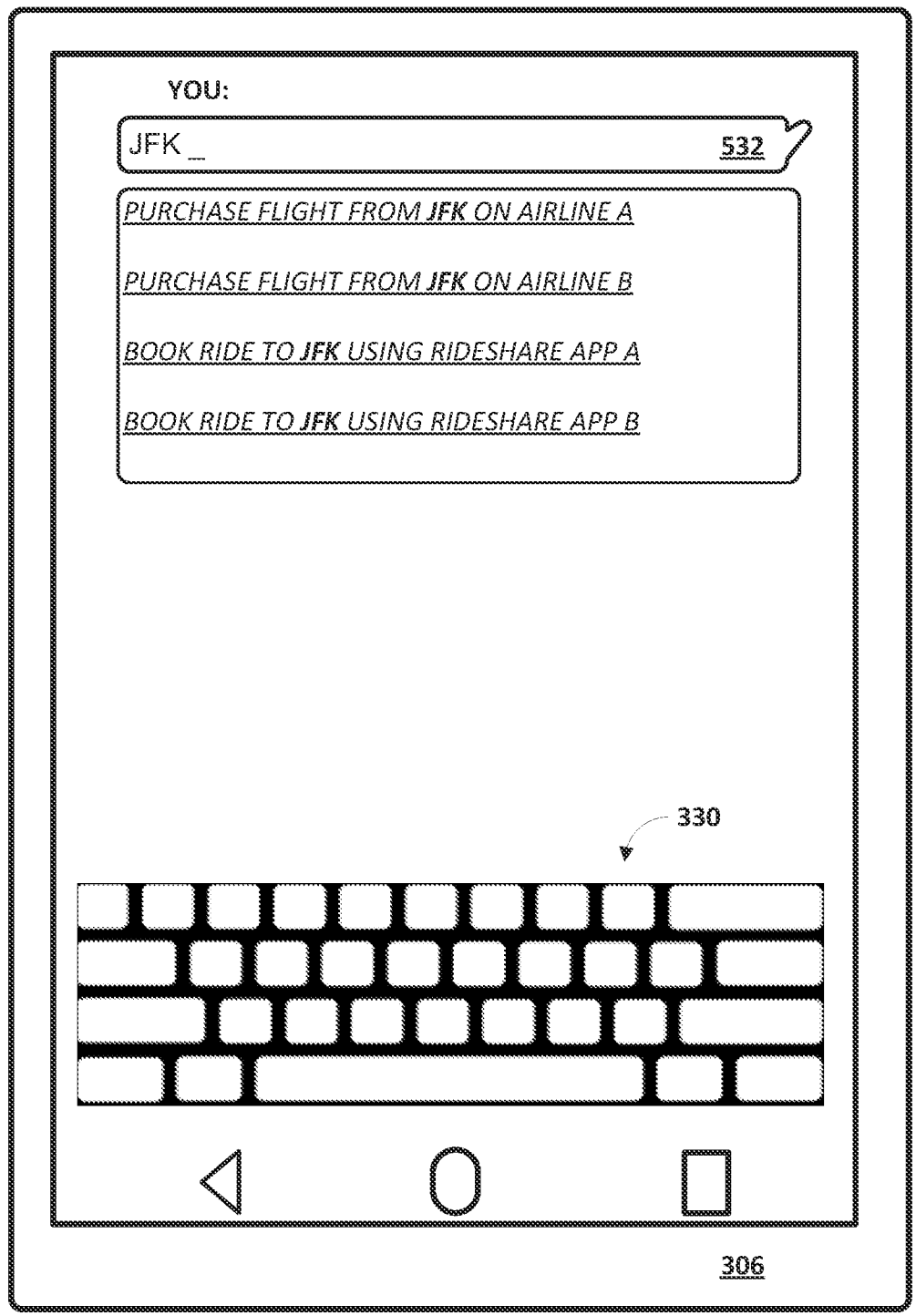

FIG. 5 depicts another example demonstrated using the same client device 306 as was depicted in FIG. 3. In FIG. 5, the user speaks or types the partial free-form natural language input, "JFK." As before, the token "JFK" may be resolved, e.g., by entity module 112, to one or more entities in knowledge graph 115, such as the airport in New York, the former president, and/or the eponymous film, to name a few. As before, a superset of candidate responsive actions may be identified, e.g., by action recommendation engine 128, such as actions relating to the airport (e.g., booking a flight to/from, booking a taxi to/from, etc.), actions relating to the former president (e.g., searching for information), actions relating to the film (e.g., stream it on various streaming apps), and so forth.

The superset of candidate responsive actions may be ranked and/or filtered until the four candidate responsive action presented as recommendations in FIG. 5 remain. In this example it can be assumed that the user and/or client device 306 is located near JFK airport, which would cause candidate responsive actions associated with JFK airport to be ranked more highly than they might be otherwise. The first recommendation is to purchase a flight from JFK on airline A, and the second recommendation is to purchase a flight from JFK on airline B. Airline A may be ranked higher than airline B for a variety of reasons, such as the user flies on airline A more frequently or has flown on airline A more recently. Additionally or alternatively, flights on airline A may be cheaper and/or may be better aligned with a schedule of the user (e.g., determined from an online calendar of the user).

Figure 6:
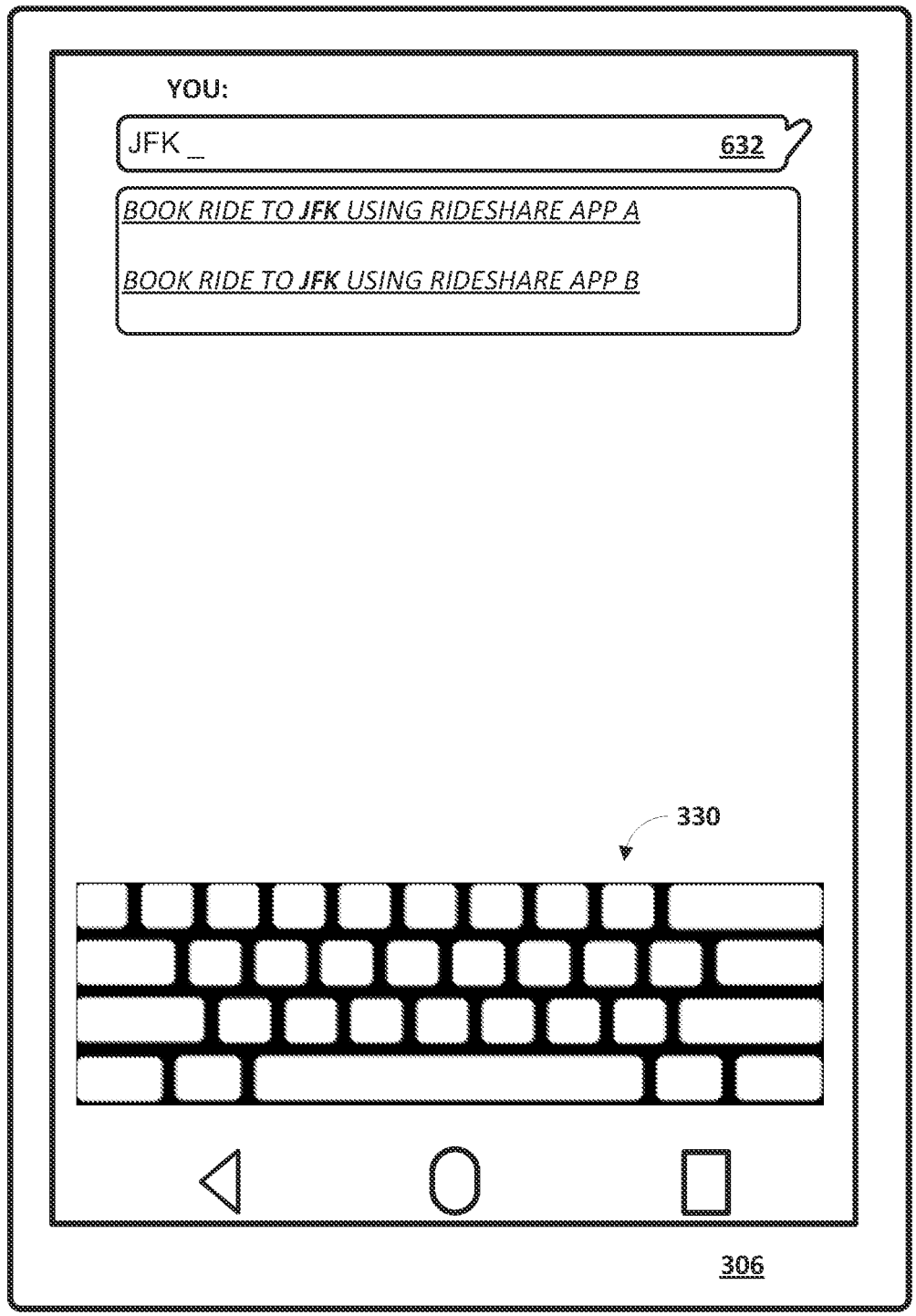

The third and fourth recommendations are to book a ride to JFK using two different rideshare applications. As before, the user may have used rideshare app A more recently, or may generally use it more frequently, than rideshare app B. The rideshare recommendations are ranked lower than the flight purchase recommendations because, for instance, the user may not yet have a flight from JFK scheduled, and users generally may tend to purchase flights well ahead of the flight, whereas users tend to book rides to the airport closer to the flight (e.g., same day). If the user already had purchased a flight from JFK, on the other hand, then the flight purchase recommendations may not appear at all (e.g., due to being filtered by filter module 110) as shown in FIG. 6. Alternatively, the flight purchase recommendations may be ranked lower than the rideshare application recommendations, especially if the departure of the already-booked flight is imminent.

Figure 7:
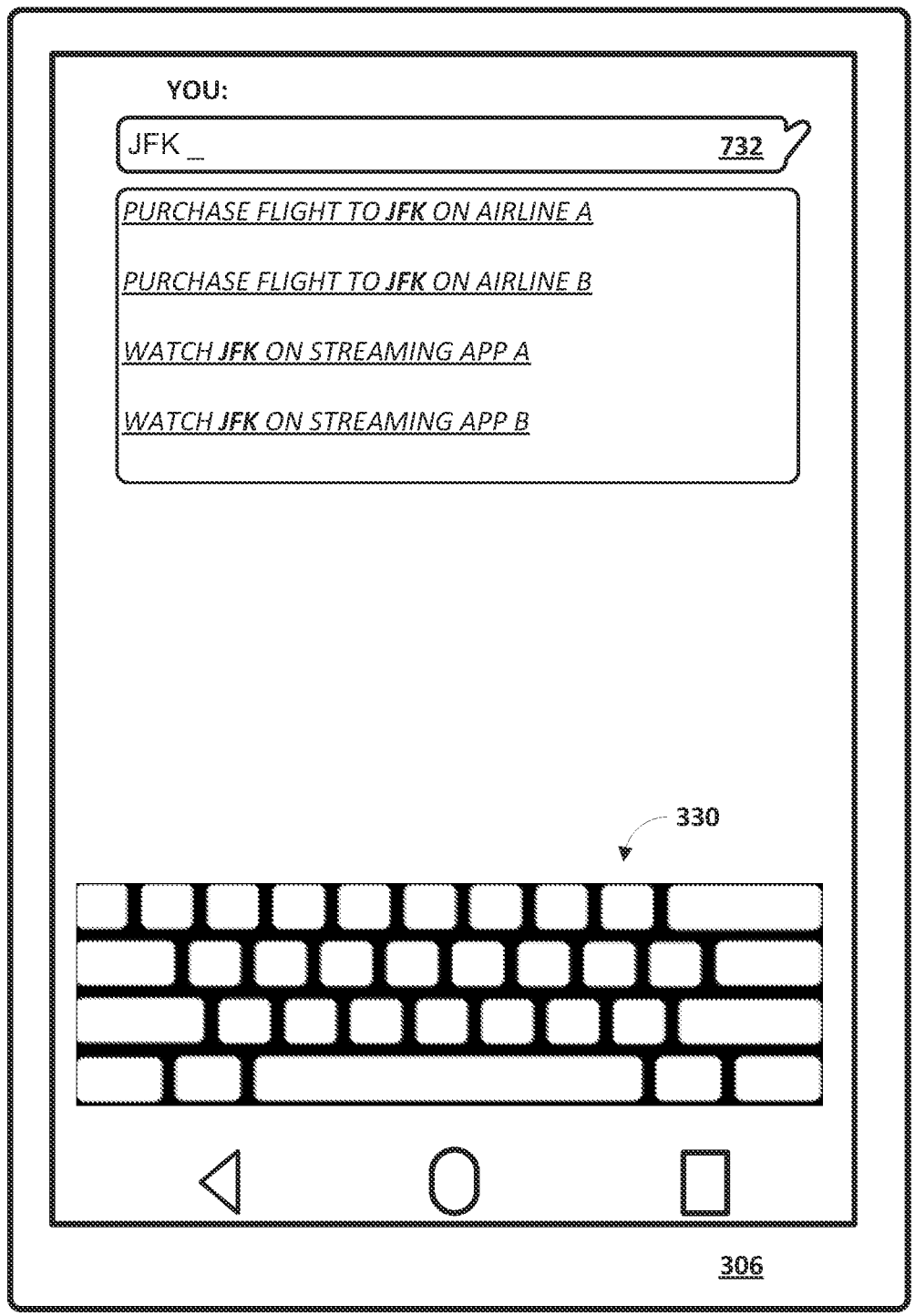

Now suppose the user of client device 306 is in a different context than in FIGS. 5-6. For example, suppose the user is not located near JFK airport, but instead is located, for instance, in San Francisco. In such a scenario, the entity JFK may be resolved or ranked, e.g., by entity module 112, differently than shown in FIGS. 5 and 6, e.g., as shown in FIG. 7. In FIG. 7, four recommendations are once again presented, but since the user/client device 306 is not located near JFK airport, the recommendations are different. The first and second recommendations are to purchase flights to JFK (as opposed to from JFK) using airlines A and B, respectively. These two recommendations may once again be ranked relative to each other based on signals such as frequency and/or how recently those airlines are used by the user of client device 306.

The third and fourth options are to watch the film "JFK" on streaming app A and streaming app B, respectively. These options may be present, whereas they were not in FIG. 5 or FIG. 6, because JFK the film may be more likely to be relevant when users are not located near the JFK airport. As with the previous examples, in this example, the streaming apps may be ranked relative to each other based on a variety of signals, such as how frequently or recently the user has used them.

Figure 8:
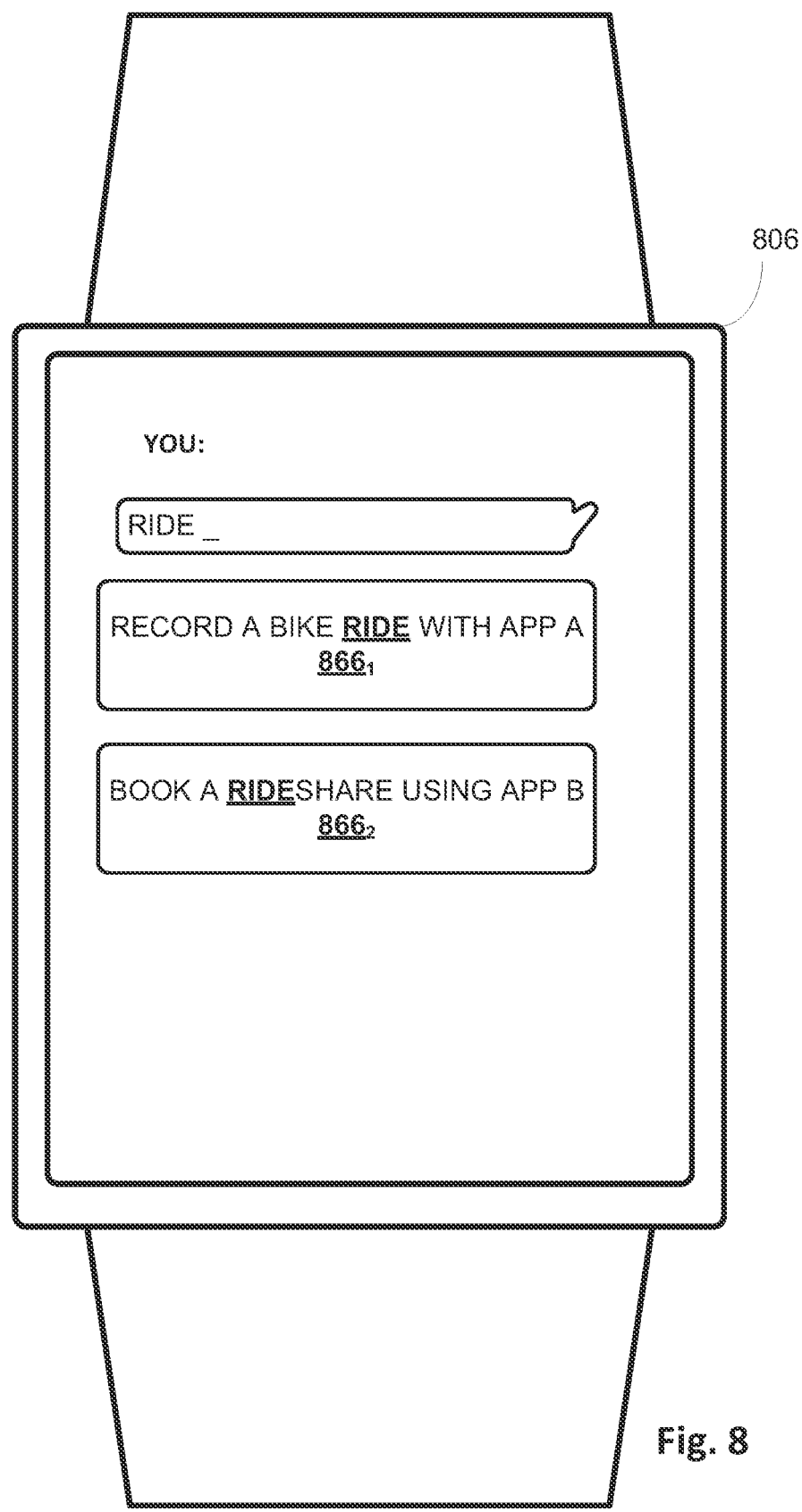

FIG. 8 depicts another client device 806 in the form of a smart watch that may or may not communicate with another device, such as a smart phone (not depicted), using a personal area network (PAN) such as Bluetooth. Client device 806 may include a variety of different physiological sensors (not depicted) such as heart rate monitors, thermometers, etc., that obtain physiological measurements from a user (not depicted). In FIG. 8, the user has typed or spoken the partial free-form natural input, "RIDE." This may mean that the user intends to begin exercising, but has not yet started and has not yet started monitoring his or her exercise using an app.

In FIG. 8, the entity type RIDE is resolved, e.g., by entity module 112 using data in knowledge graph 115 and/or named entity recognition, to identify types of RIDE entities such as riding a bike, riding a motorcycle, riding a scooter, riding a skateboard, reserving a rideshare, etc. These entities may be ranked based on various factors, such as the fact that the user is known, e.g., from operation of a cycling application over time, to have a habit of cycling, and/or uses a rideshare app with some frequency.

Entity types of "rideshare" and "cycling" may be determined, e.g., by entity module 112 and passed to action recommendation engine 128. Action recommendation engine 128 may examine mappings(s) between these entity types and various candidate responsive actions to generate a superset of candidate responsive actions, as described previously. From that superset, two of the most contextually-relevant candidate responsive actions are presented to the user as recommendations. The first is to record a bike ride with app A. The second is to book a rideshare with app B. In contrast to previous figures, in FIG. 8, the recommendations are presented as selectable graphical elements $866_{1-2}$, instead of textual links. And because client device 806 is a watch with less screen space than client device 306, less recommendations may be presented to conserve screen space.

Figure 9:
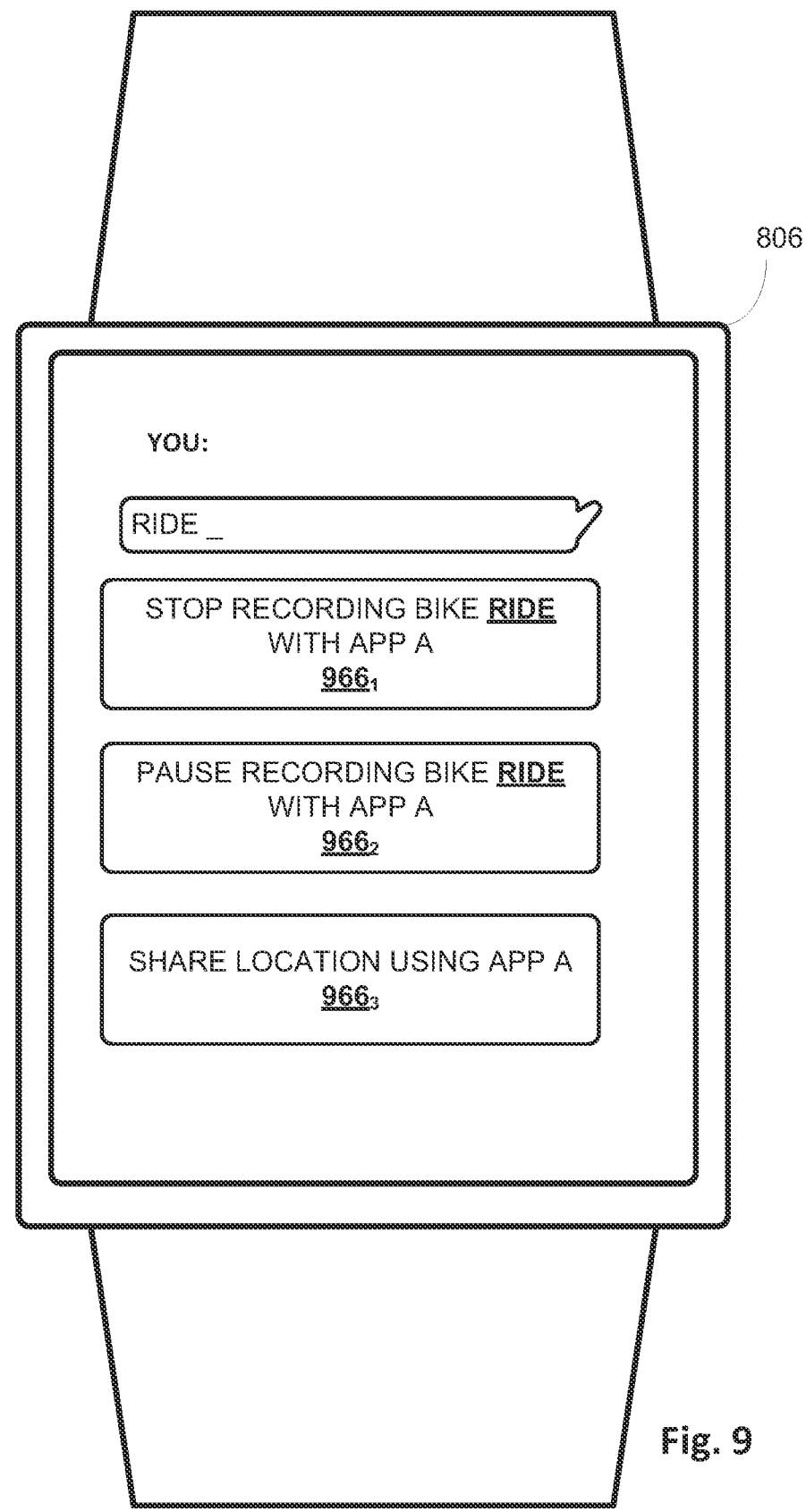

FIG. 9 depicts the same client device 806 as FIG. 8 in a slightly different context. In FIG. 9 it can be assumed that the user is already exercising, e.g., riding a bike. While the same superset of candidate responsive actions may or may not be identified by action recommendation engine 128, given the change in context, different candidate responsive actions may be presented to the user as recommendations (and others, such as those depicted in FIG. 8, may be filtered). For example, a first selectable element $966_1$ recommends, and is selectable to cause automated assistant 120 to implement, the contextually-relevant command, "stop recording bike ride with app A." A second selectable element $966_2$ recommends, and is selectable to cause automated assistant 120 to implement, the contextually-relevant command, "pause recording bike ride with app A." A third selectable element recommends, and is selectable to cause automated assistant 120 to implement, a third contextually-relevant command, "share location using app A."

FIG. 9 illustrates one example of how APIs associated with various apps may be exposed to automated assistant 120. This allows for automated assistant 120 to perform intra-application commands such as those depicted in FIG. 9, and stands in contrast to previous examples in which an entire application was invoked by automated assistant 120.

Figure 10:
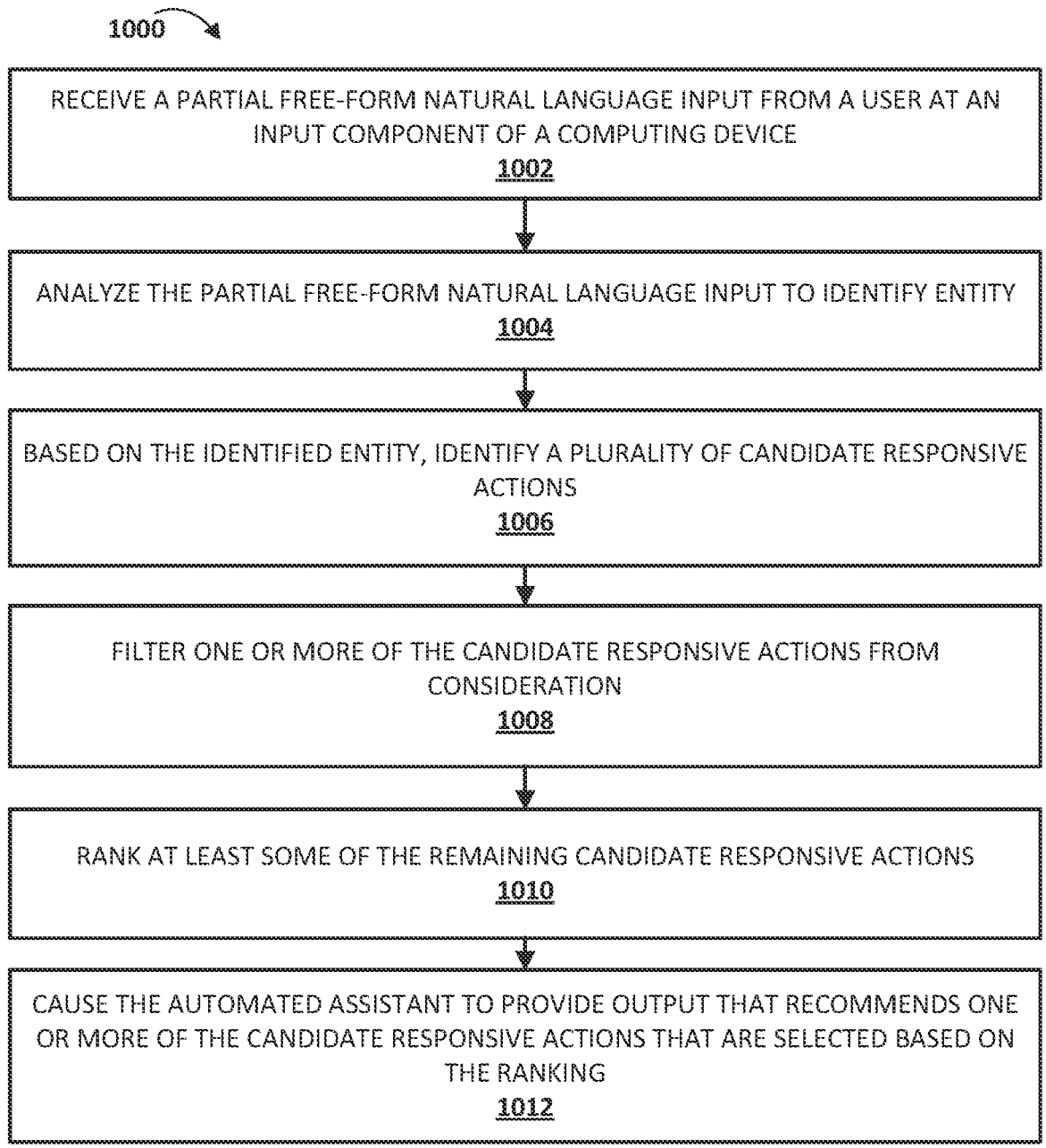
FIG. 10 depicts a flowchart illustrating another example method according to implementations disclosed herein.

FIG. 10 depicts an example method 1000 for practicing selected aspects of the present disclosure, in accordance with various embodiments. For convenience, the operations of the flow chart are described with reference to a system that performs the operations. This system may include various components of various computer systems, including automated assistant 120, action recommendation engine 128, and/or filter module 110. Moreover, while operations of method 1000 are shown in a particular order, this is not meant to be limiting. One or more operations may be reordered, omitted or added.

At block 1002, the system may receive a partial natural language input from a user at an input component of a computing device. In various implementations, the partial natural language input may identify an entity or entity type without identifying a responsive action. The partial free-form natural language input may be directed by the user to an automated assistant (e.g., 120) that operates at least in part on the computing device.

At block 1004, the system, e.g., by way of natural language processor 122 and/or entity module 112, may analyze the free-form natural language input to identify the entity or entity type, e.g., using techniques such as named entity recognition to identify an entity or entity type in knowledge graph 115.

Based on the identified entity or entity type, at block 1006, the system may identify a plurality or superset of candidate responsive actions. This superset of candidate responsive actions may include candidate responsive actions that may or may not be contextually-relevant. Accordingly, at block 1008, the system, e.g., by way of filter module 110, may filter one or more of the candidate responsive actions of the superset from consideration for recommendation to the user.

At block 1010, the system, e.g., by way of filter module 110 or action recommendation engine 128, may rank at least some of the plurality of candidate responsive actions based on one or more signals, such as entity rankings, contextual cues (e.g., location, time of day, calendar entries, social media status, etc.), and so forth. In some implementations, blocks 1006 and 1008 may be reversed, such that the superset is ranked and then filters applied. In yet other implementations, no filters may be applied, and instead, the superset may be ranked based on contextual cues, and the most relevant/responsive x candidate responsive actions (x being a positive integer such as 1, 2, 3, . . . ) may be selected. The remainder of the superset of candidate responsive actions may in effect be filtered by virtue of not falling in the top x of candidate responsive actions.

At block 1012, the system may cause automated assistant 120 to provide output that recommends one or more of the candidate responsive actions that are selected based on the ranking. Examples of such output were depicted in FIGS. 3-9.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Figure 11:
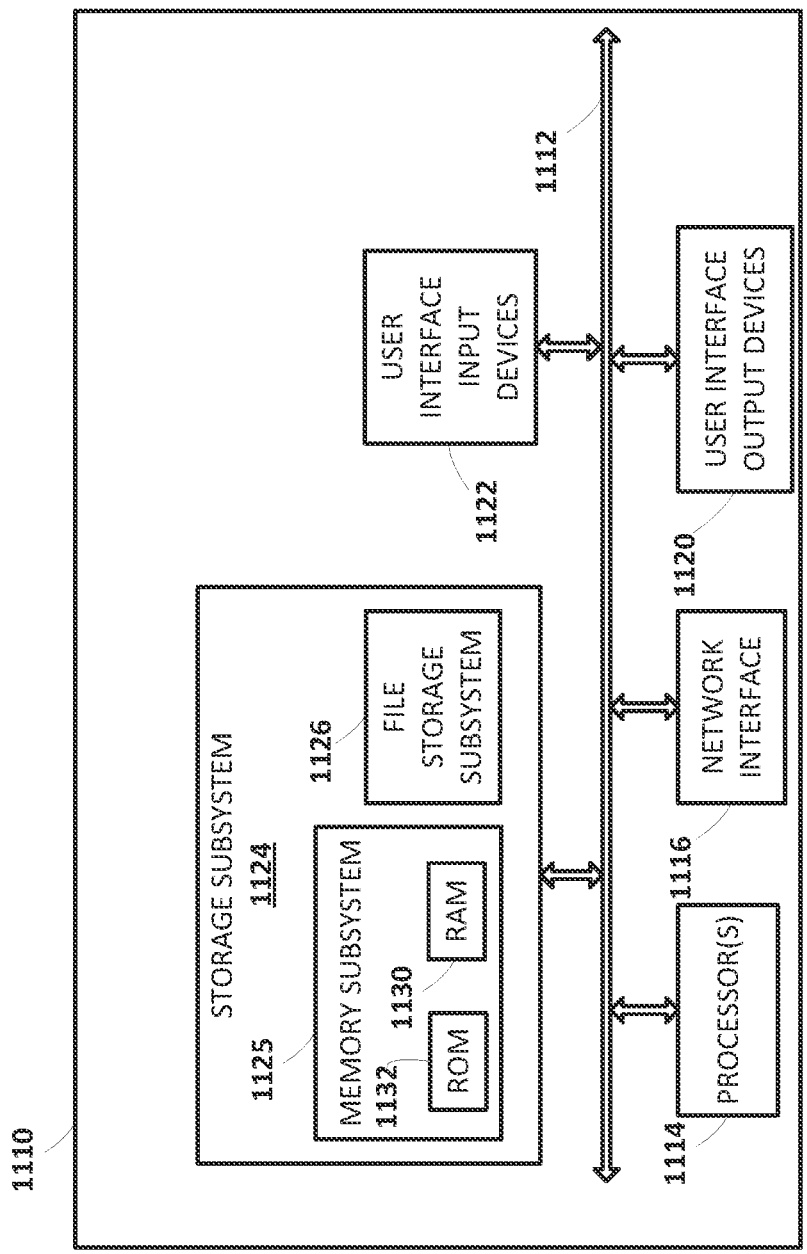
FIG. 11 illustrates an example architecture of a computing device.

FIG. 11 is a block diagram of an example computing device 1110 that may optionally be utilized to perform one or more aspects of techniques described herein. In some implementations, one or more of a client computing device, action recommendation engine 128, automated assistant 120, and/or other component(s) may comprise one or more components of the example computing device 1110.

Computing device 1110 typically includes at least one processor 1114 which communicates with a number of peripheral devices via bus subsystem 1112. These peripheral devices may include a storage subsystem 1124, including, for example, a memory subsystem 1125 and a file storage subsystem 1126, user interface output devices 1120, user interface input devices 1122, and a network interface subsystem 1116. The input and output devices allow user interaction with computing device 1110. Network interface subsystem 1116 provides an interface to outside networks and is coupled to corresponding interface devices in other computing devices.

User interface input devices 1122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1110 or onto a communication network.

User interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1110 to the user or to another machine or computing device.

Storage subsystem 1124 stores programming and data constructs that provide the functionality of some or all of the modules described herein. For example, the storage subsystem 1124 may include the logic to perform selected aspects of the method of FIG. 10, as well as to implement various components depicted in FIGS. 1-2.

These software modules are generally executed by processor 1114 alone or in combination with other processors. Memory 1125 used in the storage subsystem 1124 can include a number of memories including a main random access memory (RAM) 1130 for storage of instructions and data during program execution and a read only memory (ROM) 1132 in which fixed instructions are stored. A file storage subsystem 1126 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1126 in the storage subsystem 1124, or in other machines accessible by the processor(s) 1114.

Bus subsystem 1112 provides a mechanism for letting the various components and subsystems of computing device 1110 communicate with each other as intended. Although bus subsystem 1112 is shown schematically as a single bus, alternative implementations of the bus subsystem may use multiple busses.

Computing device 1110 can be of varying types including a workstation, server, computing cluster, blade server, server farm, or any other data processing system or computing device. Due to the ever-changing nature of computers and networks, the description of computing device 1110 depicted in FIG. 11 is intended only as a specific example for purposes of illustrating some implementations. Many other configurations of computing device 1110 are possible having more or fewer components than the computing device depicted in FIG. 11.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method using one or more processors, comprising:
receiving a partial free-form natural language input from a user at an input component of a computing device, wherein the partial free-form natural language input identifies an entity without identifying a responsive action and is directed by the user to an automated assistant that operates at least in part on the computing device;
performing named entity recognition on the partial free-form natural language input to identify an entity type of the entity;
based on the identified entity type, identifying a plurality of candidate responsive actions;
based on a state of a given application executing at least in part on the computing device, automatically filtering, from consideration, one or more of the plurality of candidate responsive actions, wherein the one or more filtered candidate responsive actions include the given application or another application of a same application type as the given application;

causing the automated assistant to provide output that recommends one or more of the candidate responsive actions that remain after the filtering; and in response to user input at the computing device selecting one of the recommended one or more candidate applications, causing the computing device to execute the selected one of the recommended one or more candidate applications.

2. The method of claim 1, further comprising ranking at least some of the plurality of candidate responsive actions based on one or more signals.

3. The method of claim 2, wherein the plurality of candidate responsive actions include a plurality of applications installed on or available via the computing device, and the one or more signals include:

how recently each of the plurality of applications was used by the user; or how frequently each of the plurality of applications are used by the user.

4. The method of claim 1, wherein the application type comprises rideshare applications, and the state of the given application indicates that the user is already travelling as part of a rideshare.

5. The method of claim 1, wherein the one or more filtered candidate responsive actions include a responsive action available within the given application.

6. The method of claim 5, wherein the given application comprises an exercise application, the state of the given application indicates that the user is currently exercising, and the one or more filtered candidate responsive actions comprises ceasing monitoring of the exercising of the user.

7. The method of claim 1, wherein the given application comprises a rideshare application, the state of the given application indicates that the user is currently travelling as part of a rideshare, and the one or more of the plurality of candidate responsive actions that is identified based on the state of the given application comprises:

altering a destination of the user; or causing a communication to be sent to another user, wherein the communication indicates a current location or estimated arrival time of the user.

8. The method of claim 1, wherein the entity is a location, and the filtering includes filtering one or more additional candidate responsive actions from consideration based on a distance between a current location of the user and the location.

9. A method using one or more processors, comprising:

receiving a partial free-form natural language input from a user at an input component of a computing device, wherein the partial free-form natural language input identifies a location without identifying a responsive action and is directed by the user to an automated assistant that operates at least in part on the computing device;

analyzing the partial free-form natural language input to identify the location;

based on the identified location, identifying a plurality of candidate responsive actions;

based on a current location of the user, automatically filtering, from consideration, one or more of the plurality of candidate responsive actions;

causing the automated assistant to provide output that recommends one or more of the candidate responsive actions that remain after the filtering; and in response to user input at the computing device selecting one of the recommended one or more candidate applications, causing the computing device to execute the selected one of the recommended one or more candidate applications.

10. The method of claim 9, wherein the filtering includes filtering one or more of the plurality of candidate responsive actions from consideration for the output based on a distance between a current location of the user and the location.

11. The method of claim 9, further comprising ranking at least some of the plurality of candidate responsive actions based on one or more signals.

12. The method of claim 11, wherein the plurality of candidate responsive actions include a plurality of applications installed on or available via the computing device, and the one or more signals include:

how recently each of the plurality of applications was used by the user; or how frequently each of the plurality of applications are used by the user.

13. A system comprising one or more processors and memory storing instructions that, in response to execution by the one or more processors, cause the one or more processors to:

receive a partial free-form natural language input from a user at an input component of a computing device, wherein the partial free-form natural language input identifies an entity without identifying a responsive action and is directed by the user to an automated assistant that operates at least in part on the computing device;

perform named entity recognition on the partial free-form natural language input to identify an entity type of the entity;

based on the identified entity type, identify a plurality of candidate responsive actions;

based on a state of a given application executing at least in part on the computing device, automatically filter, from consideration, one or more of the plurality of candidate responsive actions, wherein the one or more filtered candidate responsive actions include the given application or another application of a same application type as the given application;

cause the automated assistant to provide output that recommends one or more of the candidate responsive actions that remain after the filtering; and in response to user input at the computing device selecting one of the recommended one or more candidate applications, cause the computing device to execute the selected one of the recommended one or more candidate applications.

14. The system of claim 13, further comprising instructions to rank at least some of the plurality of candidate responsive actions based on one or more signals.

15. The system of claim 14, wherein the plurality of candidate responsive actions include a plurality of applications installed on or available via the computing device, and the one or more signals include:

how recently each of the plurality of applications was used by the user; or how frequently each of the plurality of applications are used by the user.

16. The system of claim 13, wherein the application type comprises rideshare applications, and the state of the given application indicates that the user is already travelling as part of a rideshare.

17. The system of claim 13, wherein the one or more filtered candidate responsive actions include a responsive action available within the given application.

18. The system of claim 17, wherein the given application comprises an exercise application, the state of the given application indicates that the user is currently exercising, and the one or more filtered candidate responsive actions comprises ceasing monitoring of the exercising of the user.

19. The system of claim 13, wherein the given application comprises a rideshare application, the state of the given application indicates that the user is currently travelling as part of a rideshare, and the one or more of the plurality of candidate responsive actions that is identified based on the state of the given application comprises:
- altering a destination of the user; or
- causing a communication to be sent to another user, wherein the communication indicates a current location or estimated arrival time of the user.

20. The system of claim 13, wherein the entity is a location, and the instructions to filter include instructions to filter one or more additional candidate responsive actions from consideration based on a distance between a current location of the user and the location.

\* \* \* \* \*